US008738588B2

(12) United States Patent
Cannon et al.

(10) Patent No.: US 8,738,588 B2
(45) Date of Patent: May 27, 2014

(54) SEQUENTIAL MEDIA RECLAMATION AND REPLICATION

(75) Inventors: David Maxwell Cannon, Tucson, AZ (US); Michael Allen Kaczmarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 959 days.

(21) Appl. No.: 11/690,983

(22) Filed: Mar. 26, 2007

(65) Prior Publication Data
US 2008/0243860 A1    Oct. 2, 2008

(51) Int. Cl.
*G06F 17/30*    (2006.01)

(52) U.S. Cl.
USPC ............ 707/693; 707/823; 707/831; 711/170

(58) Field of Classification Search
None
See application file for complete search history.

(56) References Cited

U.S. PATENT DOCUMENTS

| | | | |
|---|---|---|---|
| 5,564,037 A * | 10/1996 | Lam | 711/161 |
| 5,943,688 A | 8/1999 | Fisher et al. | |
| 5,953,729 A * | 9/1999 | Cabrera et al. | 707/204 |
| 6,173,359 B1 | 1/2001 | Carlson et al. | |
| 6,675,257 B1 | 1/2004 | Khalid et al. | |
| 7,054,888 B2 | 5/2006 | LaChapelle et al. | |
| 7,386,663 B2 * | 6/2008 | Cousins | 711/114 |
| 7,620,765 B1 * | 11/2009 | Ohr et al. | 711/4 |
| 2003/0196036 A1 * | 10/2003 | Gibble et al. | 711/111 |
| 2004/0268068 A1 * | 12/2004 | Curran et al. | 711/162 |

FOREIGN PATENT DOCUMENTS

| | | |
|---|---|---|
| WO | 9932995 A | 7/1997 |
| WO | WO9932995 A1 | 1/1999 |

OTHER PUBLICATIONS

EPO Communication in EP counterpart patent application 08 717 664.0-1245, mailed Apr. 19, 2010.
Garth A. Gibson et al., "A Cost-Effective, High-Bandwidth Storage Architecture", 1998 ACM, ASPLOS VII Oct. 1998, pp. 92-103.
Michael N. Nelson et al., "The Spring File System", Sun Microsystems Laboratories, Inc., SMLI TR-93-10, Feb. 1993, pp. 1-28.

* cited by examiner

*Primary Examiner* — Christyann Pulliam
*Assistant Examiner* — Charles Adams
(74) *Attorney, Agent, or Firm* — Feb Cabrasawan

(57) ABSTRACT

Sequential media reclamation is usually performed after portions of a sequential access volume's data are no longer needed and the unused portion of the volume exceeds a threshold. Improved sequential media reclamation is provided by using a sequential access disk volume (for example, a volume of a virtual tape library (VTL)) embodied as a sparse file. Reclamation of objects stored in the volume is accomplished by nulling out regions of the sparse file that contain the objects that are no longer needed. A replication method is also provided in which information about the objects stored in the sparse file (such as offset and length) is used during replication to enable the correct portions of a target volume (embodied as a sparse file) to be nulled out to match a source volume (also embodied as a sparse file).

9 Claims, 7 Drawing Sheets

SEQUENTIAL MEDIA RECLAMATION AND REPLICATION

BACKGROUND OF THE INVENTION

This invention relates in general to data storage management. More specifically, the invention relates to reclaiming sequential storage media, such as virtual tape.

Sequential media reclamation is a process in which space is reclaimed on sequential media after portions of the data stored on the media are no longer needed. The most common type of sequential media for which this process is performed is magnetic tape. Storage management systems may implement operations called "reclamation" or "recycling" to reclaim space by copying the data that is still needed from one sequential media volume to a new volume so that the source volume can be reclaimed or reused. This is typically done after a sequential volume has filled and the usable data on the volume falls below a specified threshold, typically established by the product user or administrator. The operation typically requires substantial database update activity in addition to data movement because the data location on the new volume needs to be updated in the database so that the data can be later located when needed by a restore or retrieve operation.

With certain storage management systems, backup or archive data stored on sequential media expires when a management policy (such as a retention or versioning policy) dictates that the data should no longer be retained. Because multiple files are stored sequentially on the media and each of the files may expire at differing times, segments of the data stored on the media are no longer needed over time. Upon expiration of a data object, a storage management server may logically delete the data object by removing references to the locations at which the data object was stored. Such expiration of data objects, as well as deletion of data objects for other reasons cause logical vacancies to develop in the storage volumes. Such logical vacancies are space that is taken up by objects that are no longer needed. Since sequential media allows data to be appended, but does not allow for internal sections of the media to be overwritten, the logical vacancies cannot be reused unless the media is re-written from the beginning.

FIGS. 1 through 3 illustrate sequential media reclamation. In FIG. 1, a first storage volume 105.1 is used to store a series of data objects labeled as objects A through F 110. Not shown in the figure is a storage management server that controls the reading and writing operations to the storage volume. These data objects 110 are stored sequentially on the storage volume. FIG. 1 illustrates that a usable portion 115 remains after the last data object 110. For illustrative purposes, element 120 denotes the location of the end of the final data object and thus the beginning of the usable portion 115.

FIG. 2 represents the same storage volume at a later point in time as compared with FIG. 1. During the intervening time, data objects G through M have been appended to the volume and logical vacancies 205 have been introduced because of deletion of objects B, E, G, J and L. For example, data objects may be deleted due to a retention policy or versioning policy. While the logical vacancies appear to be void of data in FIG. 2, this is for illustrative purposes only. Traditionally, when a data object is removed, it is only logically deleted, creating a logical vacancy. This may be accomplished by removing the references to the data object in the storage management server database.

FIG. 3 illustrates a new storage volume 105.2, which has been created from the physical reclamation of the first storage volume 105.1 from FIG. 2. By writing the remaining data objects 110 that are stored on the first storage volume 105.1 sequentially to this second storage volume, the logical vacancies 205 are reclaimed and thus the usable portion 115 of the second storage volume 105.2 is larger than the usable portion of the first storage volume was. After reclamation, data objects that were formerly on the first storage volume shown in FIG. 2 now are stored on the second storage volume shown in FIG. 3. This enables the first storage volume to be reused, with data objects again being written to it starting from the beginning of the tape.

The physical reclamation process described above utilizes resources of the storage management server. For example, copying the data objects from the first storage volume to the second storage volume requires server resources. As another example, reclamation typically requires substantial database update activity because the data location on the new volume needs to be updated in the database so that the data can be later located when needed by a restore or retrieve operation.

BRIEF SUMMARY OF THE INVENTION

In one embodiment, a method for reclaiming a sequential access disk volume is implemented by maintaining a set of objects for a sequential access disk volume using a sparse file. In this embodiment, the objects that are no longer needed are reclaimed by calculating region data (such as offset and length) and using this region data to remove the objects by making their regions in the sparse file null.

In another embodiment, the sequential access disk volume is a virtual tape library volume. In yet another embodiment, the method includes receiving an instruction to reclaim objects because the objects are expired or otherwise no longer needed. In yet another embodiment, the removal of objects from the sparse file is triggered when the sequential access disk volume meets a reclamation threshold indicator. In yet another embodiment, after the objects are removed from the sparse file, a database is updated with information concerning the size of the sparse file.

Other embodiments of the invention provide a method for replicating a source sequential access disk volume that is implemented as a sparse file to a target sequential access disk volume that also is implemented as a sparse file. In one embodiment, a server for the source volume sends a message to a server for the target volume. The server for the target volume parses the message to extract region data (such as offset and length) which is then used to remove objects by making their regions in the sparse file null. In one embodiment, the target and source files are virtual tape library volumes.

BRIEF DESCRIPTION OF THE SEVERAL VIEWS OF THE DRAWINGS

FIG. 4-1 is a block diagram of an exemplary storage management system.

FIG. 4-2 is a block diagram of a subset of the system from FIG. 4-1, illustrating that a virtual tape library system may be in communication with the storage repository component.

DETAILED DESCRIPTION OF THE INVENTION

Figure 1:
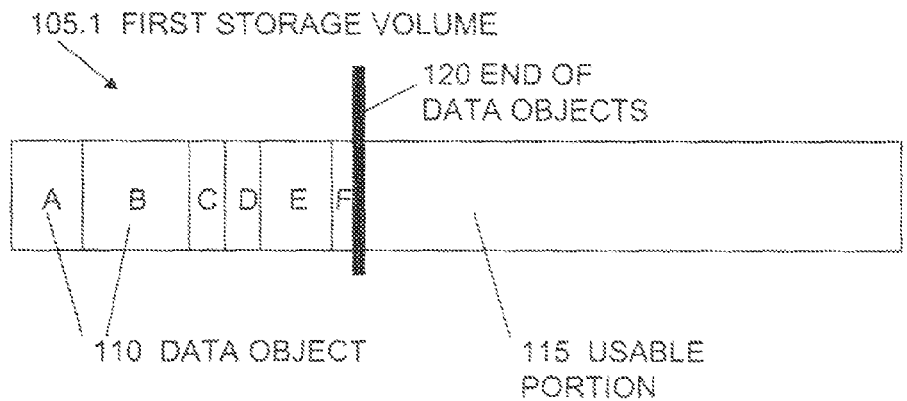
FIG. 1 is a graphical representation of a storage volume upon which are stored data objects.
Figure 2:
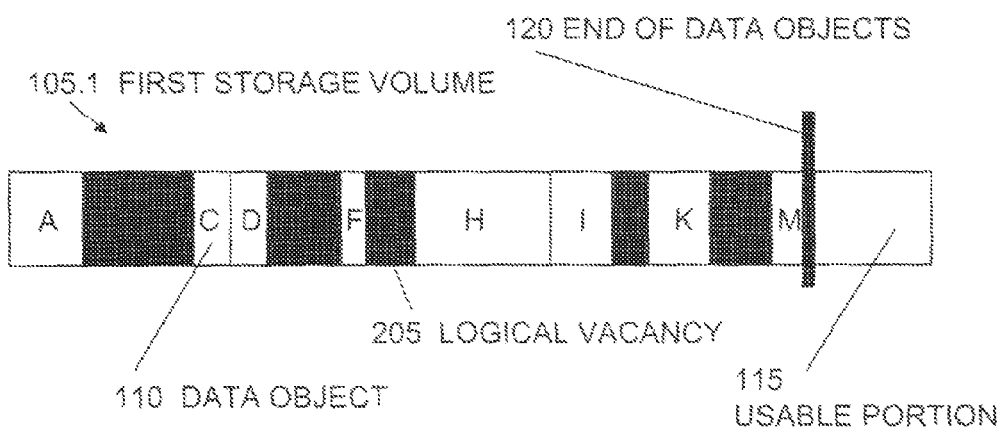
FIG. 2 is a graphical representation of the same storage volume from FIG. 1, now showing certain logical vacancies.
Figure 3:
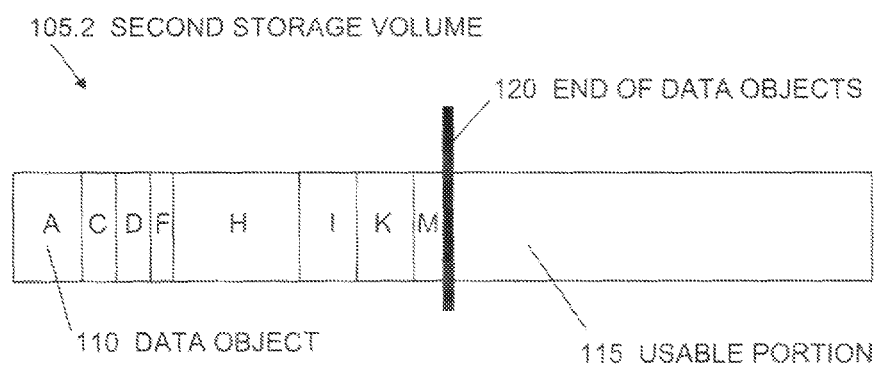
FIG. 3 is a graphical representation of a second storage volume, created by the physical reclamation of the volume shown in FIG. 2.
Figures 1, 4:
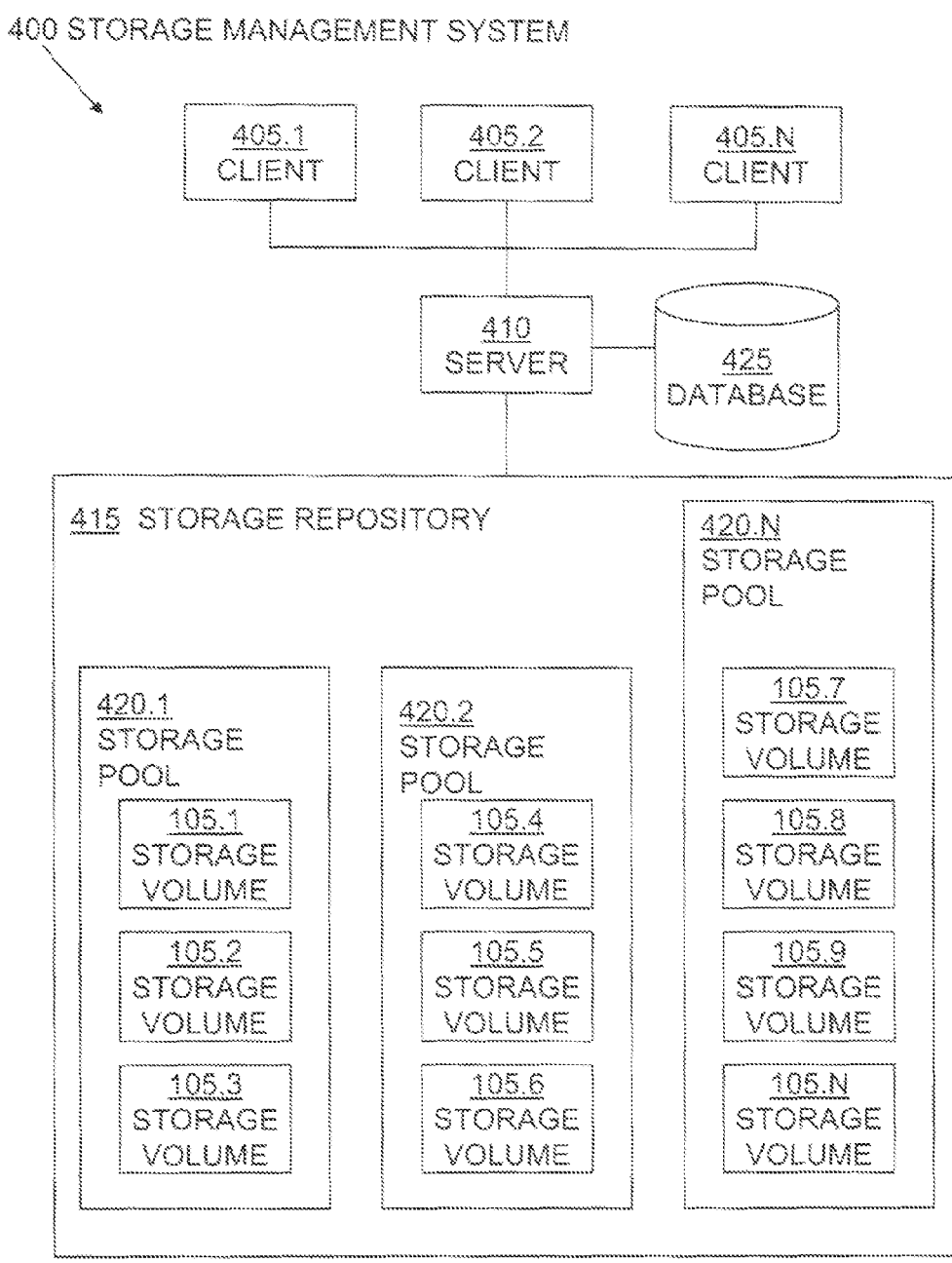
Figures 2, 4:
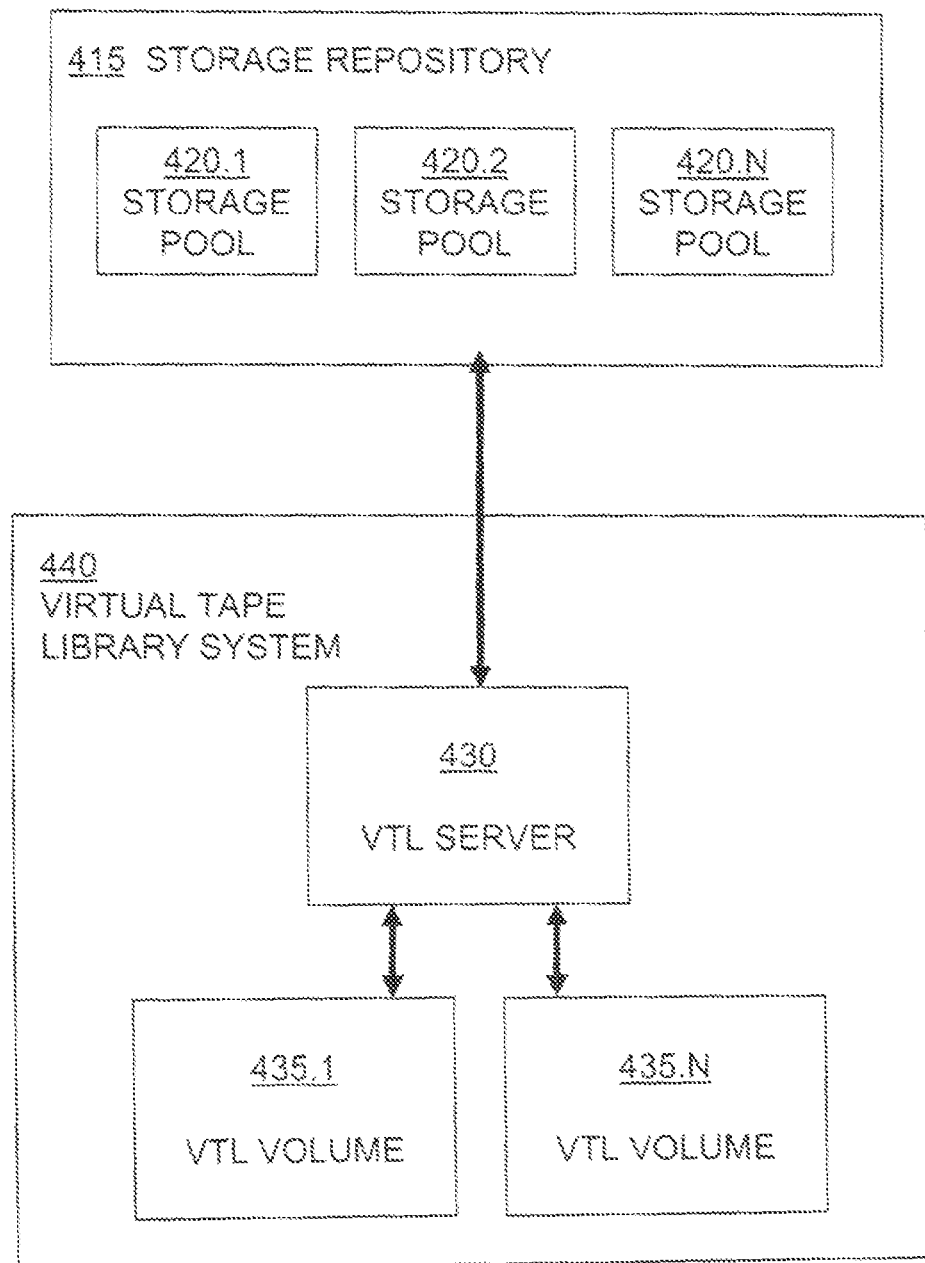

As illustrated by FIGS. 4-1 and 4-2, a storage management system 400 may have a set of clients 405 connected to a storage management server 410. The server 410 includes a processor and a memory, such as random access memory (RAM). The server 410 operates under control of an operating system stored in the memory, such as z/OS®, Linux®, Unix®, Windows®, Mac OS®, or other operating system. The server 410 preferably is in communication with database 425.

The present invention preferably may be a computer program product stored on a computer useable medium (such as a disk) with instructions which are read and executed by the storage management server 410 (or other type of computer), causing the server to perform the steps necessary to implement or use the present invention. The computer program or the operating system may also be tangibly embodied in the server's memory or accessed over a network. The present invention may also be a method for performing the steps necessary to implement or use the invention. In yet another embodiment, the invention may be a system of hardware or software components. Those skilled in the art will recognize that many modifications may be made to the embodiments of the present invention without departing its scope. Features discussed with regard to the various embodiments of the invention may be combined and need not all appear in a single embodiment. In embodiments described with the use of flowcharts, the steps may be combined or reordered without deviating from the scope of the present invention.

Through the storage management server 410, the system may manage the backup or archiving of data objects from the clients 405 to a storage repository 415. In some embodiments, the storage repository 415 consists of a set of logical storage pools 420, each containing one or more logical or physical storage volumes 105. Once data objects are stored in a storage pool 420, they may be copied or relocated to other storage pools in the storage repository 415.

The present invention makes use of virtual tape libraries (VTLs). While VTLs simulate tape, disks are usually utilized as the actual storage media. Although disks are used, the VTLs preserve the semantics of tape operations. In FIG. 4-2, a virtual tape library system 440 is shown to be in communication with the storage repository server component 415 from FIG. 4-1.

The VTL system 440 may include one or more VTL servers 430 in communication with one or more VTL volumes 435. Data stored in the storage repository 415 may be backed up, archived or otherwise moved to the VTL volumes 435 through the VTL system 440. In an alternate embodiment, the VTL system may be part of the storage repository 415 and used in place of the logical storage pools 420 or storage volumes 105.

As part of the invention, regions of the VTL's disk storage that are no longer needed are marked. In a preferred embodiment, the present invention makes use of sparse files for this task. Such sparse files null out the regions of the VTL media that are no longer needed. Because the files are sparse, the offset location for data that is still valid is preserved and database updates are not required to record the new location of the valid data. In addition, since sparse files require less disk space their use reclaims space as if the good portions of the file were copied to a new volume or file. The present invention may increase the speed of reclamation since it is a logical reclamation instead of a physical reclamation. While sparse files are described, one skilled in the art will recognize that there are other techniques to mark regions of the VTL media that are no longer needed.

Performing reclamation on a sequential media volume that is known to be backed by disk media involves identifying the regions (offsets and lengths) of the volume that are no longer needed. This information is then used to create "holes" in the volume (file) by nulling out the region to make it a sparse file which is optimized by the file system so that only the needed regions are stored on disk. Logically, the volume (file) size stays the same but utilizes less physical disk space. The offsets and lengths of the remaining needed data objects are not changed, so database updates are not needed to record the new locations. In addition, reclaimed data remain on the same logical volume (which is stored in a file) and does not have to be copied to a new logical volume so, again, database updates are not required. A VTL that can support the subject invention can be used to reduce the database activity and the data movement required to reclaim unneeded space in virtual tape volumes.

In addition to VTLs, the technique of the present invention can be used to reclaim space in sequential access disk volumes that are supported directly in a storage management system. The sequential access storage volumes (such as those with device class of type 'FILE' in products like the IBM Tivoli Storage Manager) can be implemented as files of a size specified by the administrator and filled sequentially, much like tape volumes. As with tape or with disk files in a VTL, the files need to be reclaimed to reuse unneeded space. The present invention, then, can be used directly by a storage management system and does not require a VTL.

An additional embodiment of the present invention may apply to configurations in which storage volumes on systems at separate locations are replicated over a network. In such environments, the reclamation technique of the present invention may greatly reduce the transfer of data over the network, because in a reclamation procedure the source system only needs to communicate offsets and lengths of the regions that should be nulled out on the target volume in the other system. One skilled in the art will recognize that such an implementation may require new interfaces between the source and target systems.

The implementation of this invention preferably has the logical size and physical size of the sequential media volumes recorded in a database. The physical size can be used to prevent the system from repeatedly reclaiming space that has already been reclaimed (e.g. the holes have already been made in the target volume backed by a sparse file). Reclamation operations may be triggered by calculating the amount of space that is no longer needed in a sequential access volume but which has not yet been nulled out with a sparse operation. When this reclaimable space reaches or surpasses a certain threshold value, the volume may be reclaimed.

The present invention can be explained through an example of a sequential volume that has been written to the end of volume and which has data objects that have been logically deleted. Consider a sequential volume that has a logical size of 1 GB and a physical size of 1 GB. In other words, the sequential volume does not yet contain space that has been nulled out. The storage management system may determine that 25% of the space in volume is still needed. Thus, 75% of the space is no longer required. Through the present invention, the storage management system may access the database and calculate the offsets and lengths of the regions in the volume that are no longer required. This information may then be used to null out regions of the file, introducing holes in the volume. After creating the holes, the logical size of the volume may still be 1 GB, but the physical size may be only 250 MB.

A subsequent reclamation operation in this example, may determine that the volume has 75% free space, which would indicate that the volume may need to be reclaimed. An additional check may inspect the physical size of the volume to determine that 75% of the space has already been reclaimed. This may indicate that the reclamation operation does not need to be performed again. As volumes are reclaimed through the present invention, the database preferably needs to track the physical size, logical size and the space used so that repeated reclamation operations are not performed unnecessarily. Later if the storage management system determines that the volume is now 90% free and that the physical size is 75% less than the logical size, then reclamation may be done again to reduce the physical size to perhaps only 100 MB.

Figure 5:
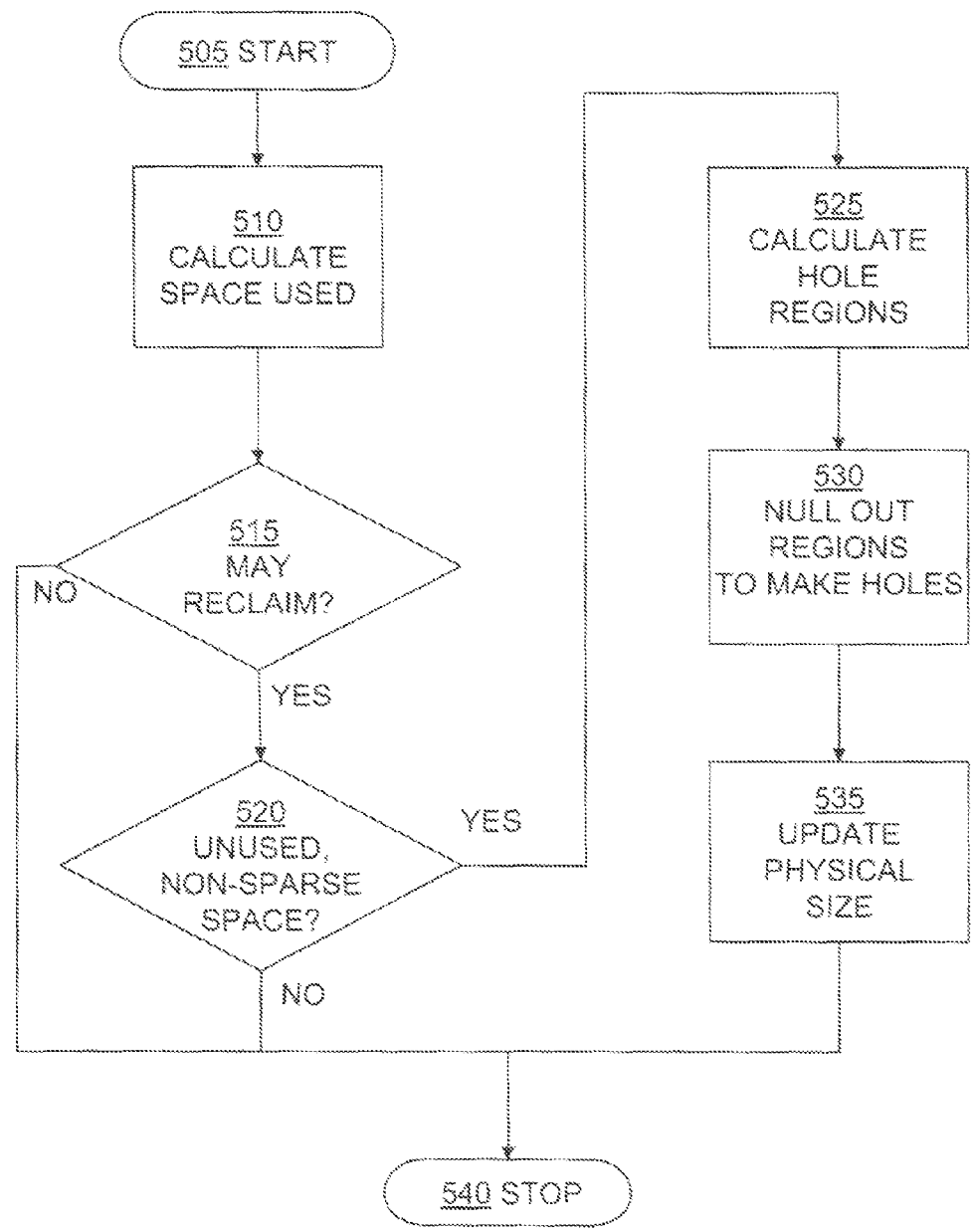
FIG. 5 is a flowchart of one embodiment of the present invention.

Having now explained one example use of the invention, focus is now turned to FIG. 5, which is a flowchart of one embodiment of the processing that may used in the present invention. This process may be applied to each or any volume in the storage repository. At step 510 of the process, the space used on the volume by needed files is calculated. Needed files are those files that have not expired, have not been deleted, are not outdated versions, etc.

At step 515, it may be determined whether the volume qualifies for reclamation. One way to do this is to compare the space used on the volume (from step 510) against the logical size of the volume. For example, one formula for making the determination may be $$\frac{(LogicalSize - SpaceUsed)}{LogicalSize} > ReclamationThreshold$$

If the volume qualifies for reclamation, the process may discover whether there is non-sparse, unused space on the volume (i.e., unused space that has not yet been nulled out) (step 520). One method to do this is to compare the space used on the volume with the physical size of the volume. If the space used is less than the physical size of the volume, the volume has empty space that has not yet been made sparse. This could be determined by requiring that the difference between physical size and space used be greater than some fixed value, or that the ratio of this difference divided by the logical volume size be greater than some threshold.

In the process shown in FIG. 5, there are two checks for determining if space should be reclaimed. The first step is at step 515 and the second check is at step 520. In other embodiments, different checks and different numbers of checks may be implemented. If space is to be reclaimed based on the various checks, the hole regions may be calculated at step 525. Here, the offset and length for each region to be nulled out (i.e., each hole) is calculated. At step 530, each hole is made sparse by nulling out the regions that were calculated in step 525. Preferably, the process of making the file sparse is handled by the VTL system 440 itself, thus offloading the activity from the server and the rest of the storage repository. As has been previously discussed, some embodiments of the invention are enabled without the use of a VTL. One skilled in the art will recognize that the present invention's scope covers embodiments with and without VTLs.

At step 535, the database is preferably updated with the new physical size for the volume. This prevents the system from repeatedly reclaiming space that has already been reclaimed.

Figure 6:
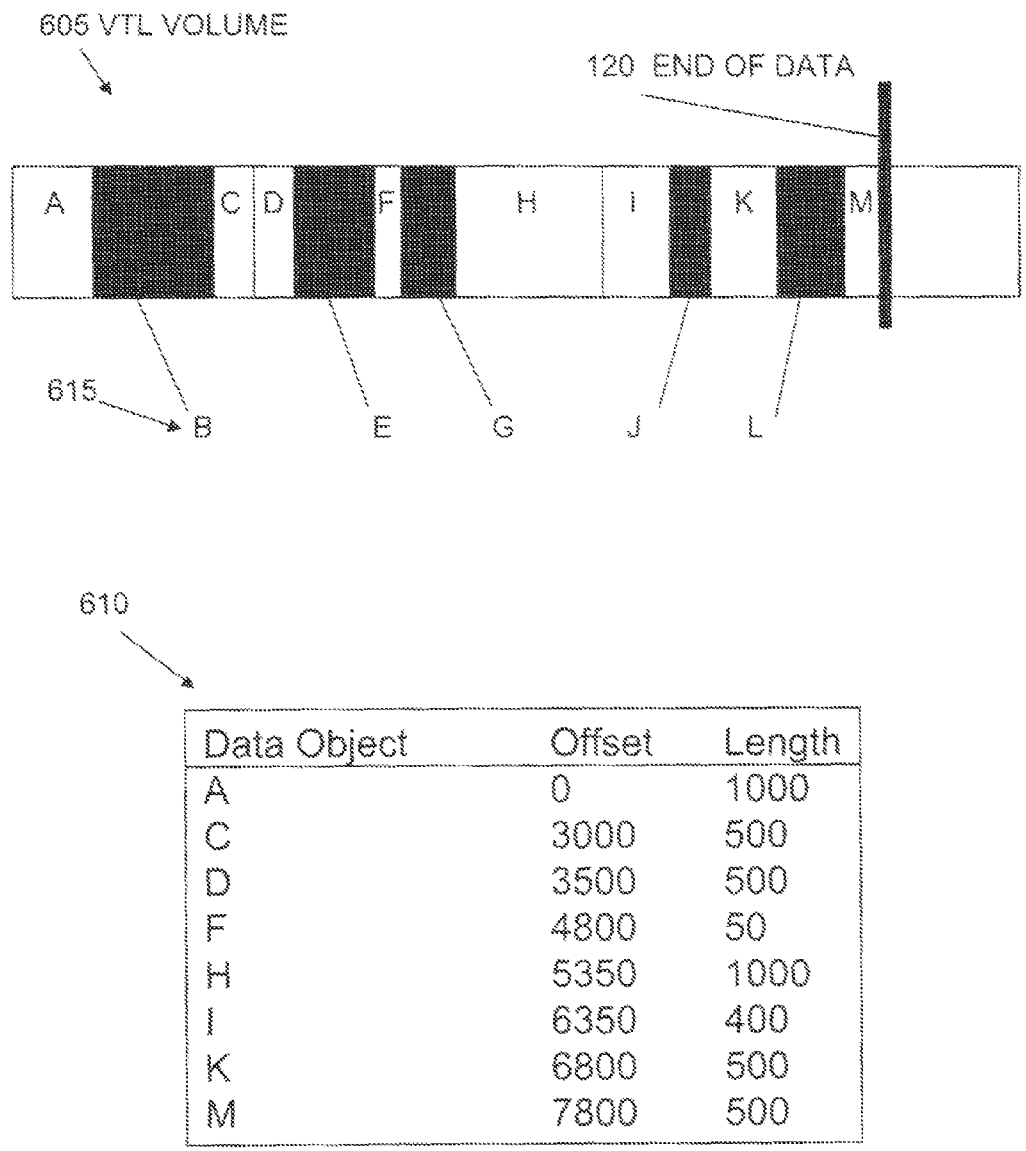
FIG. 6 is a logical view before reclamation of the storage volume from FIG. 2 and a representation of the corresponding database information.

FIG. 6 illustrates the present invention in another manner. FIG. 6 is a logical view 605 before reclamation of the storage volume from FIG. 2. FIG. 6 also includes a representation of the corresponding database information 610. As FIG. 6 illustrates, thirteen data objects 110 have been stored on the storage volume. These data objects are labeled A through M. The database 425 stores information for each data object, including object offset and object length. As one skilled in the art will recognize, the database information shown in FIG. 6 assumes that the objects were indeed logically stored sequentially on the disk. In reality, the VTL may physically store them non-sequentially on various sector regions of the disk.

FIG. 6 illustrates a VTL volume 605 that emulates the storage volume from FIG. 2. In FIG. 6, data objects B, E, G, J and L have been removed as they were no longer needed. The database information 610 shows that these data objects no longer exist, in effect creating "holes" for the former data objects 615. If the server 410 requests one of the removed objects (such as object B), the VTL will return zeroes or another indicator to indicate that the data object does not exist on the system. If data objects are arranged in sequential order in the database, the invention may detect the offset and length of vacancies caused by former data objects by recognizing gaps between remaining data objects. For example, the invention may detect a gap between data objects A and C because A ends at offset 1000 and C does not begin until offset 3000. In an alternative embodiment, the database may be updated with a flag to indicate that a data object has been logically removed. In yet another embodiment, the database may be updated to show zero offset and zero length a logically removed data object. One skilled in the art will recognize that there are other techniques that can be used to recognize vacancies corresponding to regions that should be nulled out.

The present invention avoids movement of data objects during reclamation. Furthermore, because none of the objects on the volume are moved during reclamation, there is no need to update the database records for the remaining objects. Thus, by using the present invention for reclamation, the present invention provides for the possibility of increasing the speed of reclamation and reducing database updates.

Figure 7:
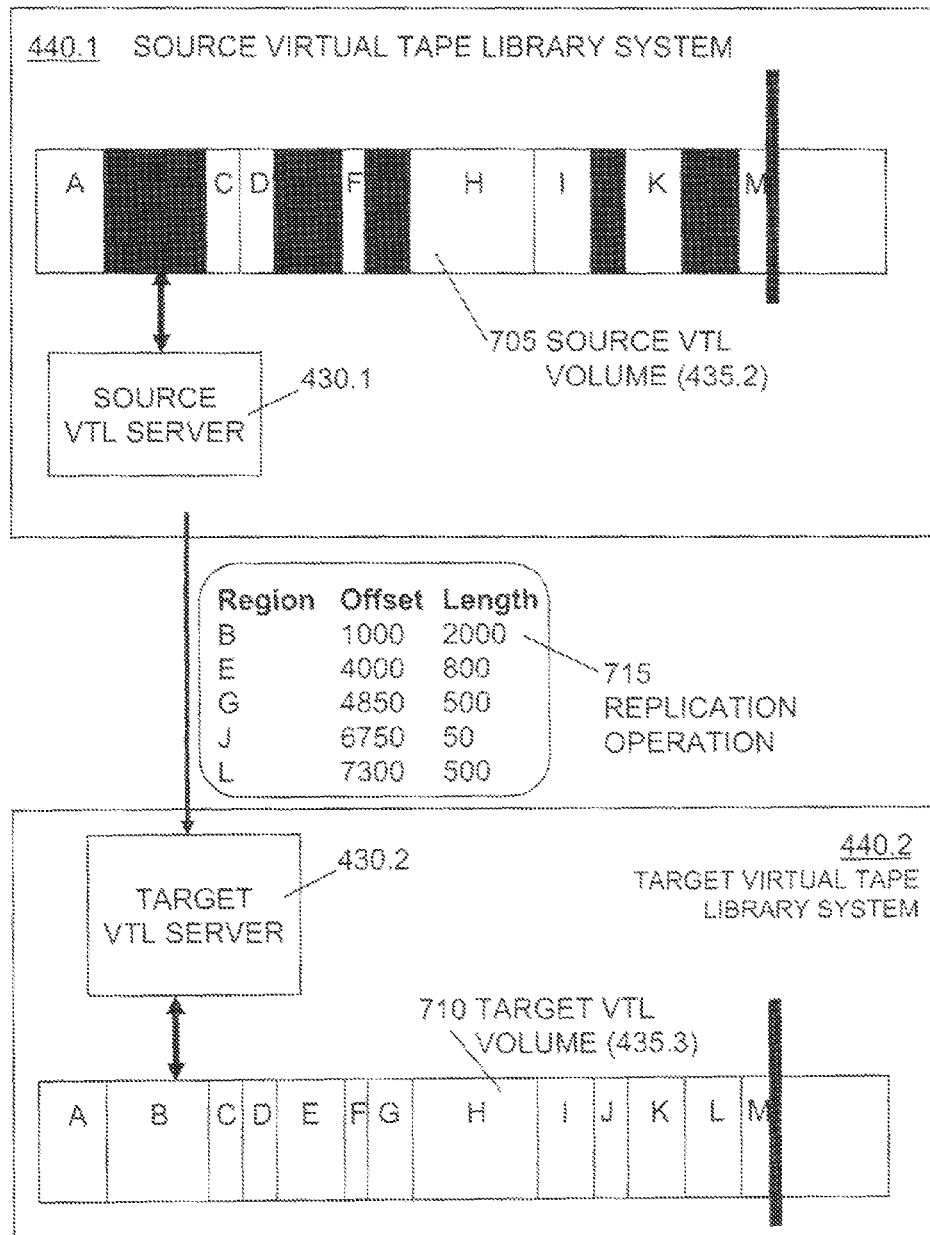
FIG. 7 illustrates a replication operation for a source and target volume that are both sparse files.

The present invention is useful not only for reclamation, but also for replication. For example, FIG. 7 shows two VTL systems 440, one of which may include a source VTL volume 705 for which a replica VTL volume 710 is maintained on the other VTL system. As a replica, this target VTL volume 710 is replicated from time-to-time so that it is a duplicate of the source volume 705. In one embodiment of the invention, the source VTL server 430.1 may send a message 715 to the target VTL server 430.2. The message may contain information about the regions that are no longer needed. This information may be, for example, the offset and length for each unneeded region. The replication process, then, is the process of the target VTL server 430.2 nulling out regions of the target sparse file 710 as indicated by the message 715. In this way, the present invention may greatly reduce the amount of data transferred over the network during the replication process.

Described herein are various embodiments of the invention, providing a reclamation method for a sequential access disk volume as well as a replication method for a source and target sequential access disk volume. In some of the discussion, embodiments have been discussed in terms of virtual tape library volumes. One skilled in the art will recognize that the invention is applicable to other forms of sequential access disk volumes. For example, the invention may also be practiced with volumes with device class of type 'FILE' in products like the IBM Tivoli Storage Manager, etc.

The embodiments described herein and illustrated in the drawings include methods and systems. One skilled in the art will recognize that the scope of the invention extends to methods in which the steps are reordered or accomplished differently. As a system, the invention can be implemented as a series of components created in hardware or software. For example, the invention may make use of a calculation component, an object removal component, a receiver, an evaluator, an updater, a replication message, a parser, etc. These components, which may also be found in the subsequent claims, are readily created by one skilled in the art based on the detailed description and drawings. One skilled in the art will also understand that the invention can also be embodied as a computer program that is stored on a computer readable medium. None of the various embodiments described herein should be read as limiting the invention to just the steps, components and computer code described, but rather the embodiments serve as a way to teach the concepts of the invention to one skilled in the art.

What is claimed is:

1. A method comprising:
    determining a used space of a logical volume of a storage repository that is currently being used by a plurality of needed files, the needed files each being a file that has one of: not expired as opposed to having expired, not deleted as opposed to having been deleted, and not outdated as opposed to being outdated;
    determining whether the logical volume qualifies for reclamation by comparing the used space of the logical volume against a logical size of the logical volume, such that where a difference between the logical size and the used space divided by the logical size is greater than a first predetermined reclamation threshold, the logical volume qualifies for reclamation;
    only in direct response to determining that the logical volume qualifies for reclamation, determining whether a non-sparse and unused space of the logical volume exists by determining whether the used space of the logical volume is less than a physical size of the logical volume, such that where a difference between the physical size and the used space divided by the logical size is greater than a second predetermined threshold, the non-sparse and unused space of the logical volume exists;
    only in direct response to determining that the non-sparse and unused space of the logical volume exists, determining an offset and a length of each hole region of a plurality of hole regions of the logical volume, the offset of a hole region being a location of where the hole region starts within the logical volume relative to a beginning of the logical volume;
    after determining the offset and the length of each hole region of the logical volume, nulling out each hole region of the logical volume by writing a null value to each position of a plurality of positions of each hole region, the plurality of positions starting at the offset into the logical volume and ending within the logical volume at the offset plus the length, where nulling out each hole region of the logical volume renders each hole region sparse; and
    after nulling out each hole region of the logical volume, updating a database with the physical size of the logical volume that has changed due to each hole region of the logical volume having been nulled out, where updating the physical size of the logical volume is configured to prevent repeated reclamation of space of the logical volume.

2. The method of claim 1, wherein the method is performed by a server communicatively connected to the database, the logical volume is a virtual tape library volume of a virtual tape library system, the server and the virtual tape library system are communicatively connected to the storage repository, and where the server and the virtual tape library system are different servers and systems, and
    wherein nulling out each hole region of the logical volume by writing a null value to each position of each hole region comprises the server instructing the virtual tape library system to write a null value to each position of each hole region to render each hole region sparse as opposed to the server directly writing a null value to each position of each hole region, such that rendering each hole region sparse is offloaded from the server and from the storage repository to the virtual tape library system.

3. The method of claim 1, wherein the logical volume is a sequential access disk volume.

4. A computer program product comprising a non-transitory computer useable medium having a computer readable program, wherein the computer readable program, when executed on a computer, causes the computer to perform a method comprising:
    determining a used space of a logical volume of a storage repository that is currently being used by a plurality of needed files, the needed files each being a file that has one of: not expired as opposed to having expired, not deleted as opposed to having been deleted, and not outdated as opposed to being outdated;
    determining whether the logical volume qualifies for reclamation by comparing the used space of the logical volume against a logical size of the logical volume, such that where a difference between the logical size and the used space divided by the logical size is greater than a first predetermined reclamation threshold, the logical volume qualifies for reclamation;
    only in direct response to determining that the logical volume qualifies for reclamation, determining whether a non-sparse and unused space of the logical volume exists by determining whether the used space of the logical volume is less than a physical size of the logical volume, such that where a difference between the physical size and the used space divided by the logical size is greater than a second predetermined threshold the non-sparse and unused space of the logical volume exists;
    only in direct response to determining that the non-sparse and unused space of the logical volume exists, determining an offset and a length of each hole region of a plurality of hole regions of the logical volume, the offset of a hole region being a location of where the hole region starts within the logical volume relative to a beginning of the logical volume;
    after determining the offset and the length of each hole region of the logical volume, nulling out each hole region of the logical volume by writing a null value to each position of a plurality of positions of each hole region, the plurality of positions starting at the offset into the logical volume and ending within the logical volume at the offset plus the length, where nulling out each hole region of the logical volume renders each hole region sparse; and
    after nulling out each hole region of the logical volume, updating a database with the physical size of the logical volume that has changed due to each hole region of the logical volume having been nulled out, where updating the physical size of the logical volume is configured to prevent repeated reclamation of space of the logical volume.

5. The computer program product of claim 4, wherein the method is performed by a server communicatively connected to the database, the logical volume is a virtual tape library volume of a virtual tape library system, the server and the virtual tape library system are communicatively connected to the storage repository, and where the server and the virtual tape library system are different servers and systems, and wherein nulling out each hole region of the logical volume by writing a null value to each position of each hole region comprises the server instructing the virtual tape library system to write a null value to each position of each hole region to render each hole region sparse as opposed to the server directly writing a null value to each position of each hole region, such that rendering each hole region sparse is offloaded from the server and from the storage repository to the virtual tape library system.

6. The computer program product of claim 4, wherein the logical volume is a sequential access disk volume.

7. A system comprising:
a storage repository including a logical volume;
a database; and
a server containing a memory and a processor to:
determine a used space of the logical volume of the storage repository that is currently being used by a plurality of needed files, the needed files each being a file that has one of: not expired as opposed to having expired, not deleted as opposed to having been deleted, and not outdated as opposed to being outdated;
determine whether the logical volume qualifies for reclamation by comparing the used space of the logical volume against a logical size of the logical volume, such that where a difference between the logical size and the used space divided by the logical size is greater than a first predetermined reclamation threshold, the logical volume qualifies for reclamation;
only in direct response to determining that the logical volume qualifies for reclamation, determine whether a non-sparse and unused space of the logical volume exists by determining whether the used space of the logical volume is less than a physical size of the logical volume, such that where a difference between the physical size and the used space divided by the logical size is greater than a second predetermined threshold, the non-sparse and unused space of the logical volume exists;
only in direct response to determining that the non-sparse and unused space of the logical volume exists, determine an offset and a length of each hole region of a plurality of hole regions of the logical volume, the offset of a hole region being a location of where the hole region starts within the logical volume relative to a beginning of the logical volume;
after determining the offset and the length of each hole region of the logical volume, null out each hole region of the logical volume by writing a null value to each position of a plurality of positions of each hole region, the plurality of positions starting at the offset into the logical volume and ending within the logical volume at the offset plus the length, where nulling out each hole region of the logical volume renders each hole region sparse; and
after nulling out each hole region of the logical volume, update the database with the physical size of the logical volume that has changed due to each hole region of the logical volume having been nulled out, where updating the physical size of the logical volume is configured to prevent repeated reclamation of space of the logical volume.

8. The system of claim 7, wherein the logical volume is a virtual tape library volume of a virtual tape library system, the server and the virtual tape library system are communicatively connected to the storage repository, and where the server and the virtual tape library system are different servers and systems, and wherein the server is to null out each hole region of the logical volume by writing a null value to each position of each hole region by instructing the virtual tape library system to write a null value to each position of each hole region to render each hole region sparse as opposed to the server directly writing a null value to each position of each hole region, such that rendering each hole region sparse is offloaded from the server and from the storage repository to the virtual tape library system.

9. The system of claim 7, wherein the logical volume is a sequential access disk volume.

* * * * *